Jan. 22, 1924.

H. CARLE 1,481,347

MACHINE FOR MAKING BOXES

Filed Jan. 8, 1921

INVENTOR
H. Carle
BY
Duell, Warfield & Duell
ATTORNEY

Jan. 22, 1924.

H. CARLE 1,481,347

MACHINE FOR MAKING BOXES

Filed Jan. 8, 1921    12 Sheets-Sheet 2

INVENTOR
H. Carle
BY
Duell, Warfield & Duell
ATTORNEY

Jan. 22, 1924.
H. CARLE
1,481,347
MACHINE FOR MAKING BOXES
Filed Jan. 8, 1921   12 Sheets-Sheet 3
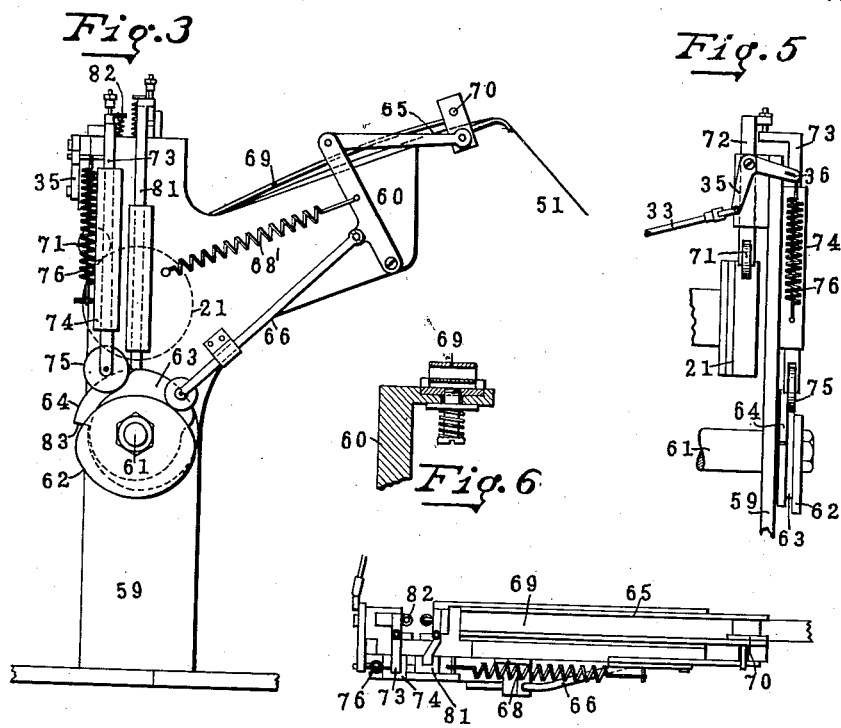
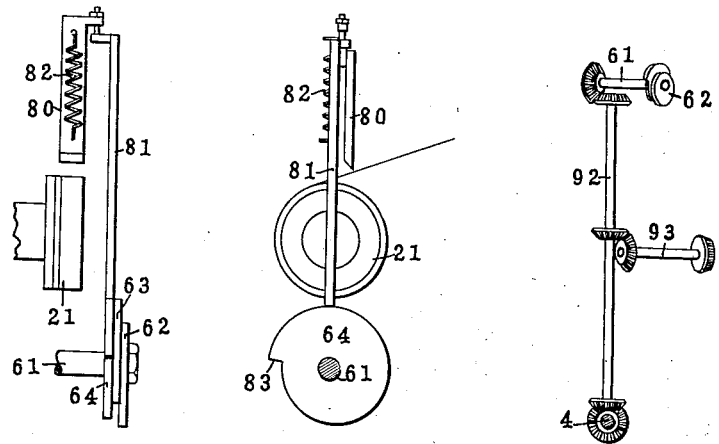
INVENTOR
H. Carle
BY
Duell Warfield & Duell
ATTORNEY Jan. 22, 1924.  
H. CARLE  
1,481,347  
MACHINE FOR MAKING BOXES  
Filed Jan. 8, 1921   12 Sheets-Sheet 4
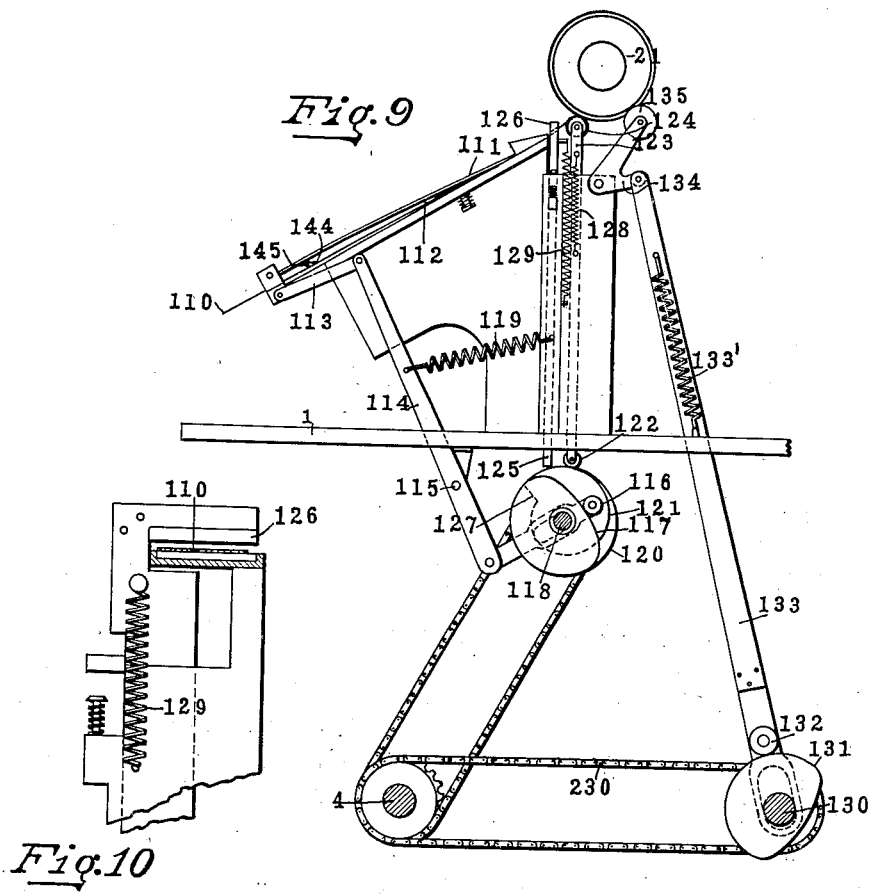
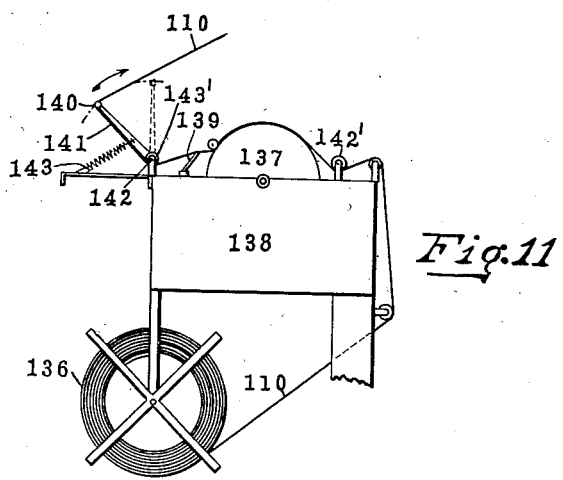
INVENTOR  
H. Carle.  
BY  
Duell, Warfield & Duell  
ATTORNEY Jan. 22, 1924.
H. CARLE
1,481,347
MACHINE FOR MAKING BOXES
Filed Jan. 8, 1921
12 Sheets-Sheet 5
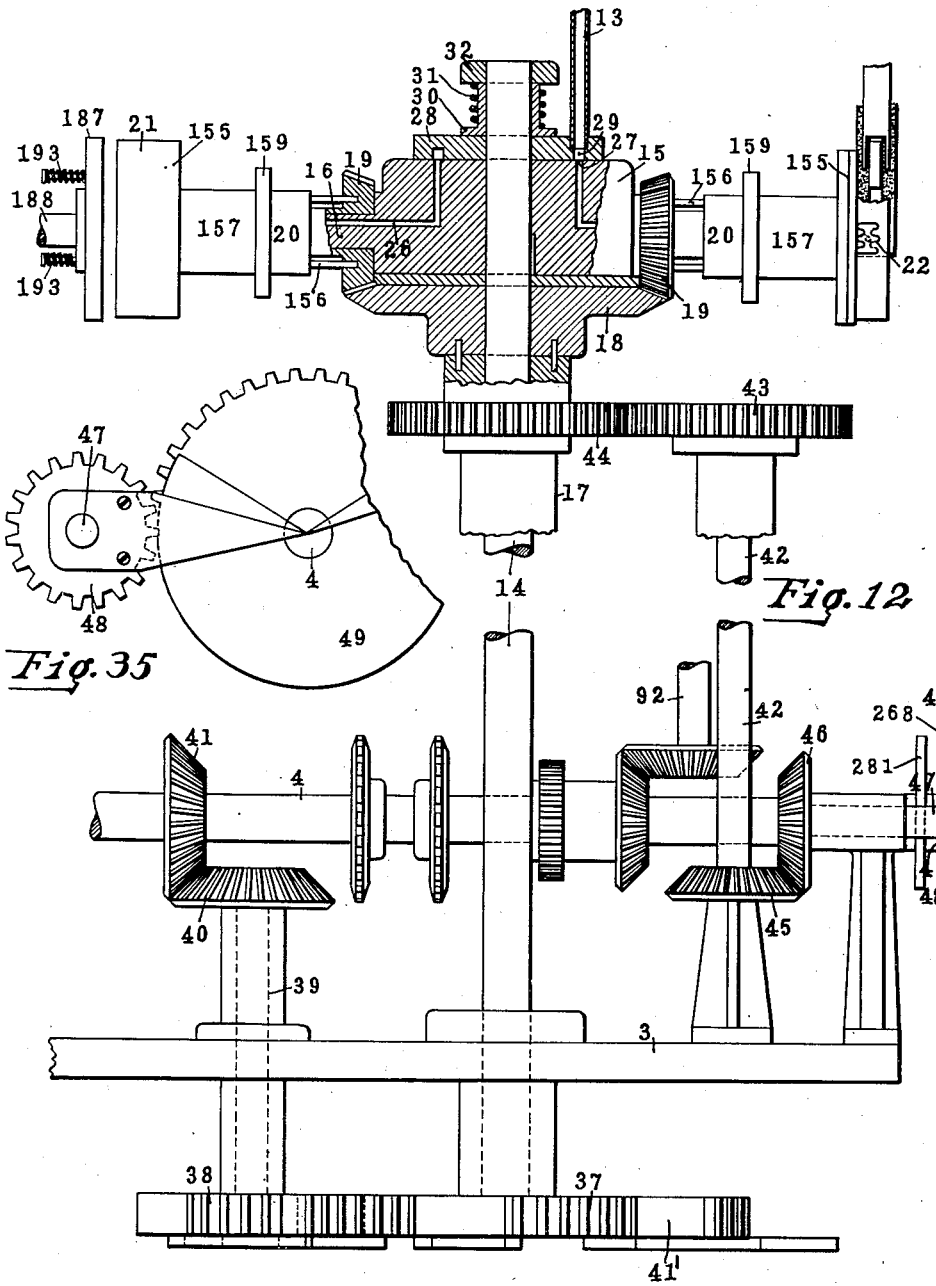

Jan. 22, 1924.

H. CARLE 1,481,347

MACHINE FOR MAKING BOXES

Filed Jan. 8, 1921   12 Sheets-Sheet 6

INVENTOR
H. Carle,
BY
Duell, Warfield & Duell.
ATTORNEY

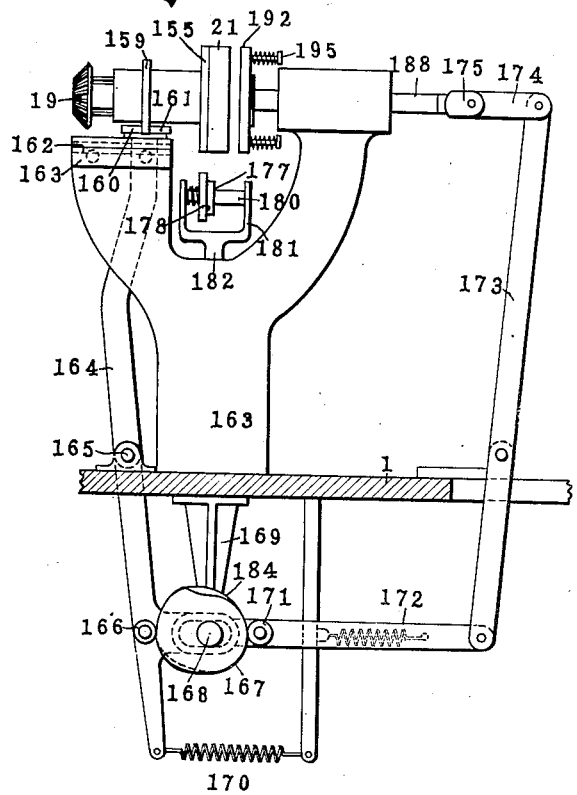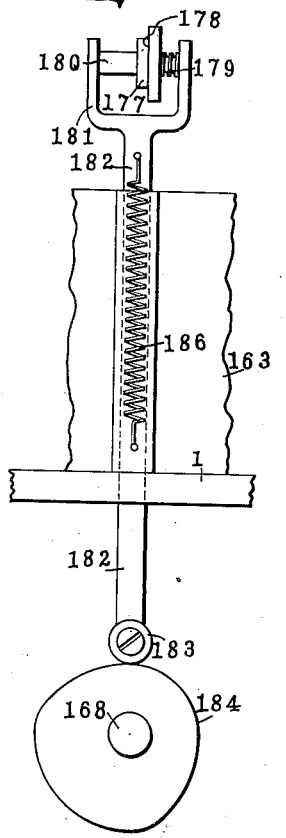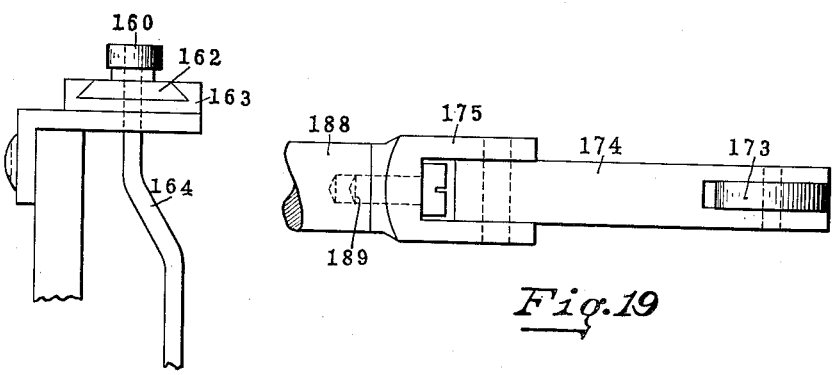

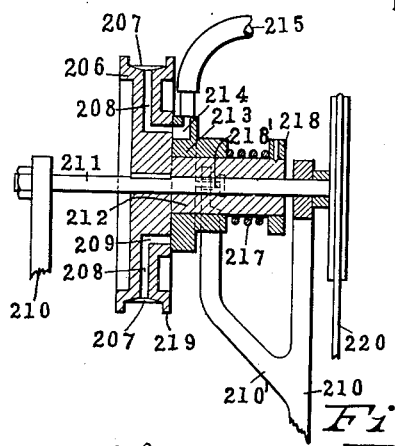
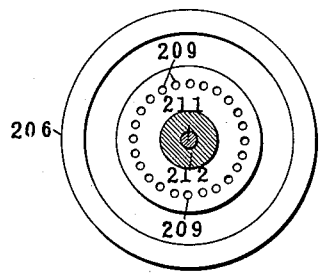
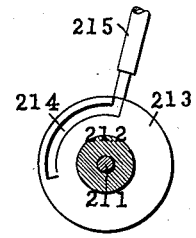
Fig.20  Fig.21  Fig.22
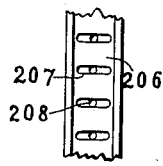
Fig.23
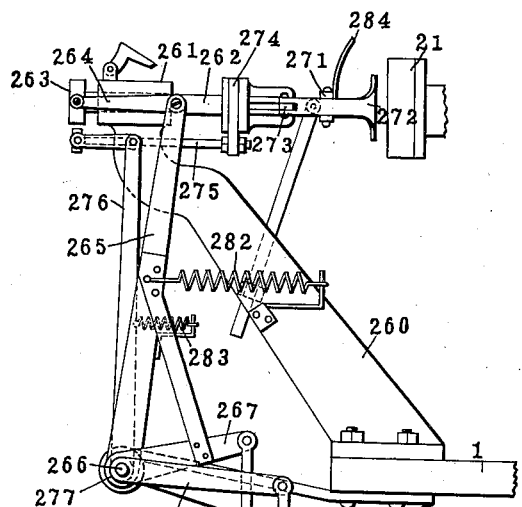
Fig.36
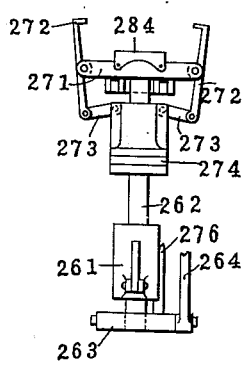
Fig.37
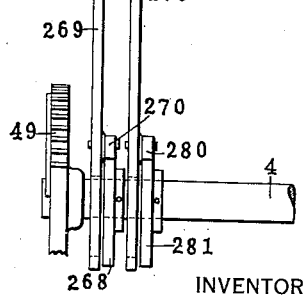

Jan. 22, 1924.

H. CARLE 1,481,347

MACHINE FOR MAKING BOXES

Filed Jan. 8, 1921    12 Sheets-Sheet 9

INVENTOR
H. Carle
BY
Duell, Warfield & Duell
ATTORNEY

Jan. 22, 1924.  1,481,347
H. CARLE
MACHINE FOR MAKING BOXES
Filed Jan. 8, 1921   12 Sheets-Sheet 10
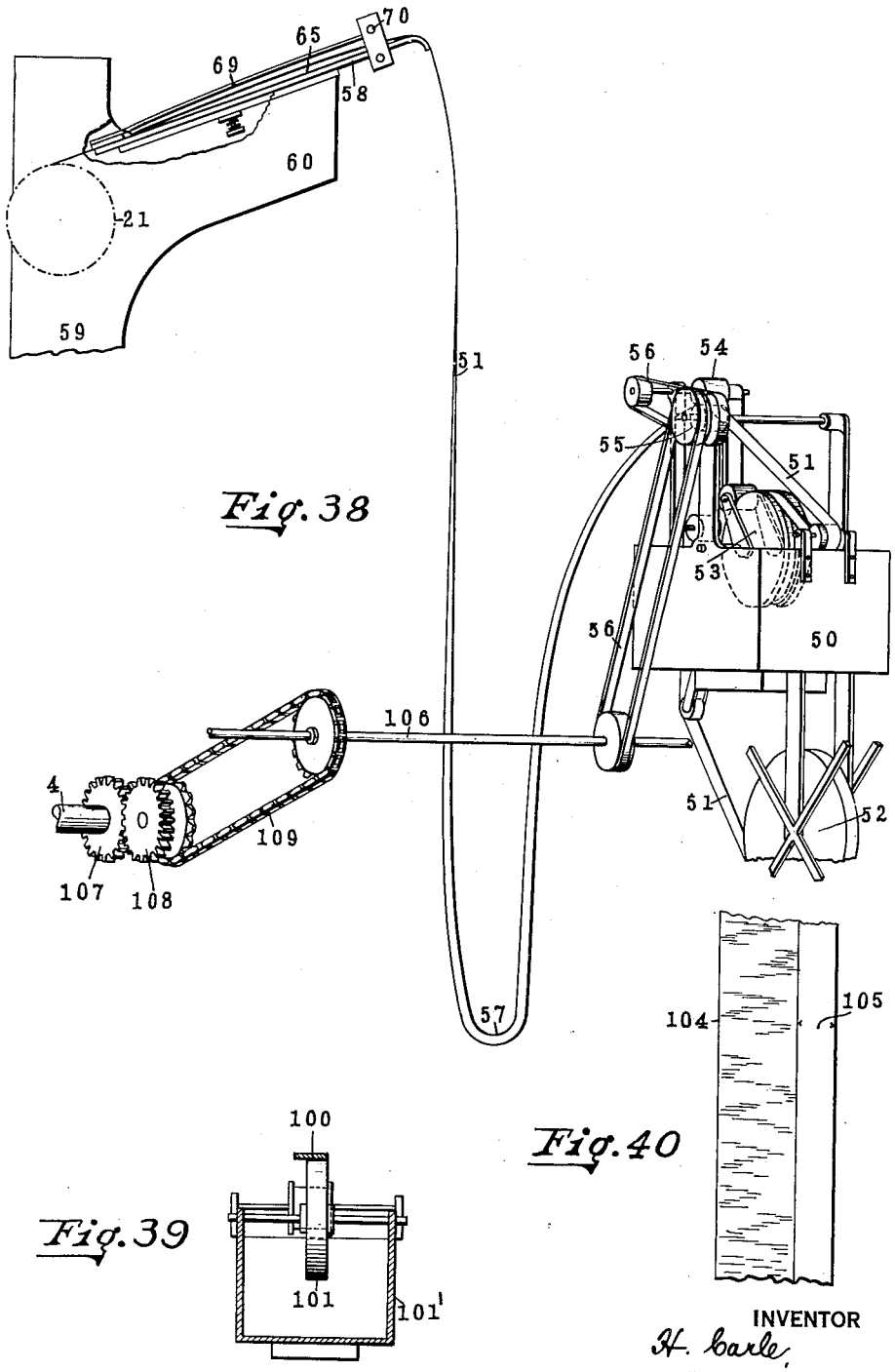

Jan. 22, 1924.
H. CARLE
1,481,347
MACHINE FOR MAKING BOXES
Filed Jan. 8, 1921    12 Sheets-Sheet 11
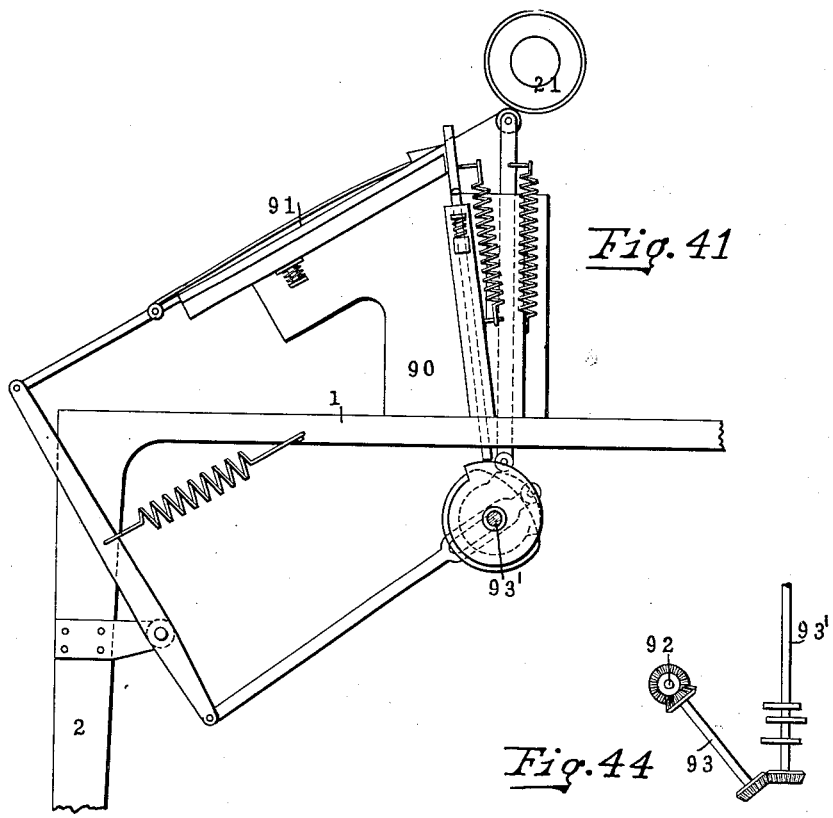
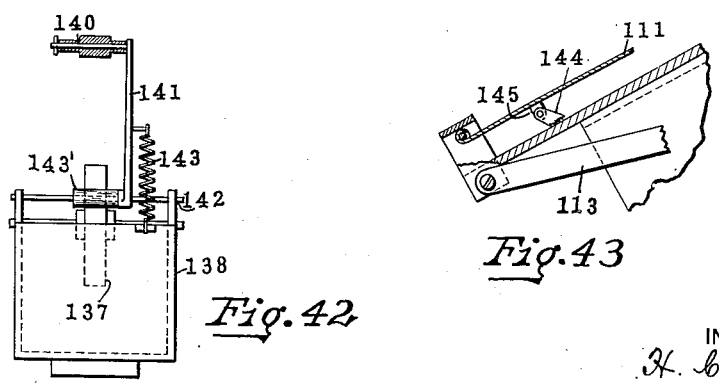
INVENTOR
H. Carle
BY
ATTORNEY

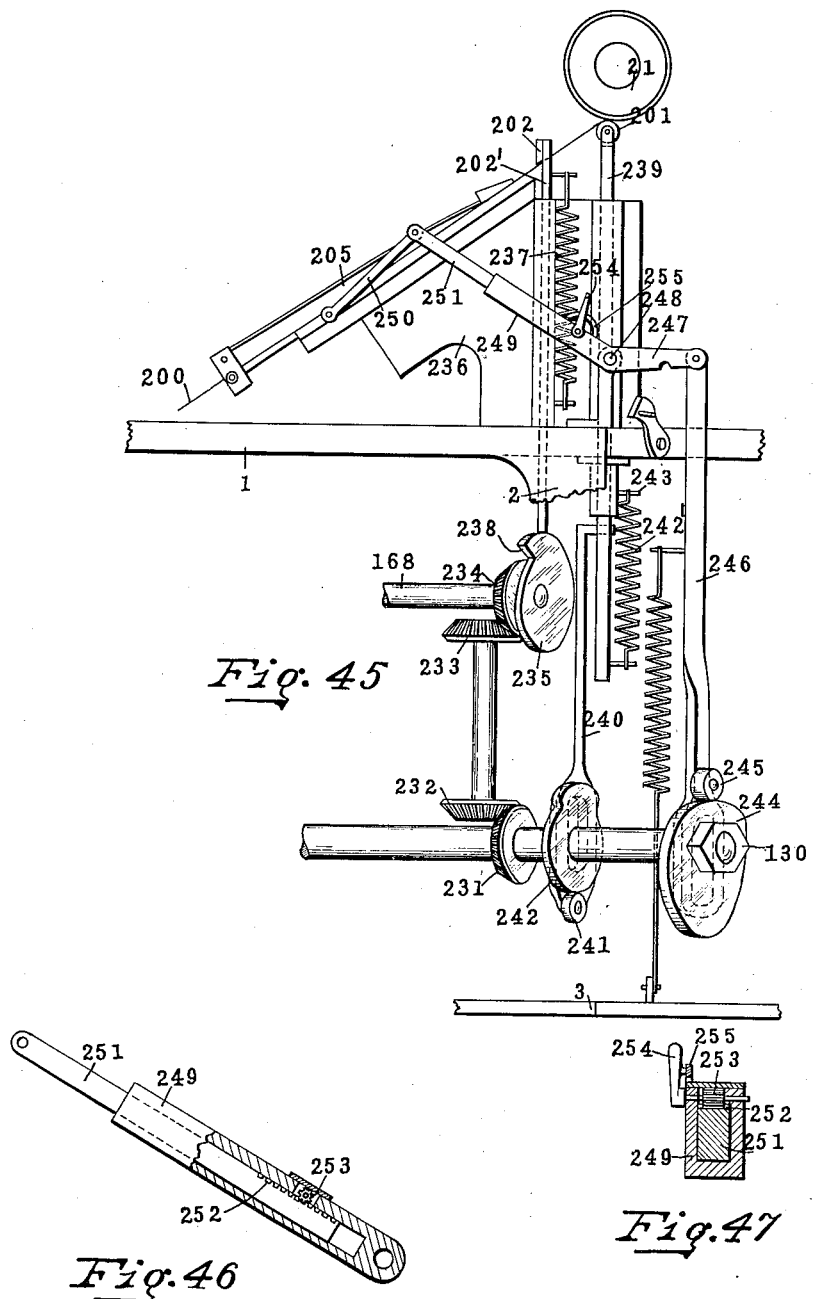

Patented Jan. 22, 1924.

1,481,347

UNITED STATES PATENT OFFICE.

HAROLD CARLE, OF BUFFALO, NEW YORK, ASSIGNOR TO F. N. BURT COMPANY, LIMITED, OF TORONTO, ONTARIO, CANADA, A CORPORATION OF ONTARIO.

MACHINE FOR MAKING BOXES.

Application filed January 8, 1921. Serial No. 435,827.

*To all whom it may concern:*

Be it known that I, HAROLD CARLE, a subject of the Kingdom of Great Britain, residing at Buffalo, in the county of Erie and State of New York, have invented certain new and useful Improvements in Machines for Making Boxes, of which the following is a full, clear, and exact description, such as will enable others skilled in the art to which it appertains to make and use the same.

This invention relates to machines for making boxes, and with respect to its more specific features to machines for automatically making box parts from supplies of paper strip.

One of the objects of the invention is the provision of a practical machine for rapidly and continuously automatically making paper box elements which may be used for flanges and the like of stiff paper boxes.

Another object of the invention is the provision of efficient mechanism for continuously automatically preparing stiff box flanges and the like from strips of relatively thin paper.

Another object of the invention is the provision of simple and practical mechanism for continuously automatically making multiple-ply paper rings suitable for efficient crimping.

Another object of the invention is the provision of practical and simple mechanism for simultaneously pneumatically gripping paper strips or rings to a series of rotatable formers, or mandrels, respectively, and controlling the energization and de-energization of the same during the operations of winding the strips on the several formers.

Another object of the invention is the provision of efficient mechanism for gluing, feeding, guiding, and controlling a thin paper strip and winding it into a smooth multiple-ply ring free from puckers and wrinkles.

Another object of the invention is the provision of practical mechanism for folding thin paper around the edges of previously made multiple-ply rings to bind the plies of the rings together and provide finished edges.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification and wherein similar reference characters refer to similar parts throughout the several views, Figure 1 represents a side elevation of a machine embodying the invention;

Fig. 3 is an elevation illustrating the construction of the device for feeding, severing, and applying a paper strip to the former at the first station;

Fig. 4 is a plan view of Fig. 3;

Fig. 5 is an edge view of Fig. 3;

Fig. 6 is a sectional detail through the strip feeding device illustrated in Fig. 3;

Figs. 7 and 8 are details of the strip severing device of Fig. 3;

Fig. 9 is a side elevation of the devices for feeding, severing, and applying a strip to a former at a third station, this figure also illustrating a device for folding the side of such strip;

Fig. 10 is a detailed view of the severing device illustrated in Fig. 9;

Fig. 11 is a side elevation of the gluer for the strip fed by the device illustrated in Fig. 9, this figure also illustrating a device for ironing such strip;

Fig. 12 illustrates an enlarged elevation, partly sectional, of the former turret and certain associated driving devices, at the fourth station.

Fig. 16 represents a side elevation of certain folding devices operating at the fourth station;

Fig. 17 represents a detail of a folding roller and its operating devices for the fourth station;

Fig. 18 is a detail view of a folder shifter employed at the fourth station;

Fig. 19 is a detail of certain operating devices for one of the folders employed at the fourth station;

Fig. 20 is a vertical section illustrating a pneumatic gripper strip-feeding wheel and devices co-operating therewith;

Fig. 21 is a face view of the pneumatic wheel of Fig. 20;

Fig. 22 is a view of the inside of a stationary air controlling valve employed with the pneumatic wheel;

Fig. 23 represents a detail of the periphery of the pneumatic gripping wheel;

Figure 33:
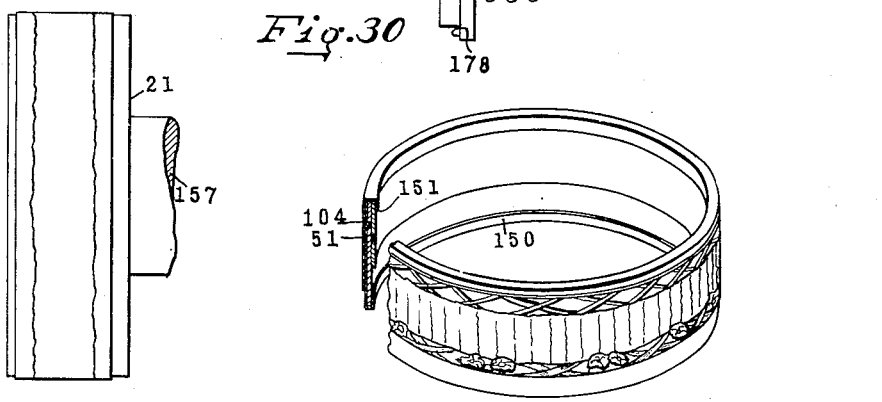

Figs. 26 to 32, inclusive, illustrate several of the strips employed in the present machine, associated with the formers and other parts at the several stations of the machine;

Fig. 33 illustrates a finished ring which may be made by the present machine;

Fig. 34 is a diagrammatic view of certain parts of the drive mechanism for the machine;

Fig. 35 represents a detail of Fig. 12;

Fig. 36 represents a side elevation of the mechanism for discharging the rings from the formers;

Fig. 37 is a plan view of a portion of the mechanism of Fig. 36;

Fig. 38 is a perspective view of the gluer for the first station, its operating devices and the strip feeder for this station;

Fig. 39 is a sectional view of the strip moistener for the second station;

Fig. 40 illustrates a length of craft strip as moistened by the device of Fig. 39;

Fig. 41 is a side elevation of the strip feeding device for the second station;

Fig. 42 is an end view of the ironing device of Fig. 11;

Fig. 43 is a sectional detail of Fig. 9;

Fig. 44 is a plan of certain driving details of Fig. 41;

Fig. 45 is a generally perspective view of the strip feeding, cutting, and applying devices for the fifth station; and Figs. 46 and 47 are details of Fig. 45.

Referring now more specifically to the drawings, the numeral 1 (Fig. 1) indicates the machine frame or table supported on legs 2 and having a lower shelf or platform 3. Supported in suitable bearings on the platform 3 is the horizontal main driving shaft 4 which may be driven from an electric motor 5 through intermediate gears 6, 7, 8, and 9, the gear 9 being on a shaft 10 coaxial with the main shaft 4 and adapted to be coupled or uncoupled with the main shaft by a suitable cluch and clutch shifting mechanism. Also supported on the platform 3 is an air-exhaust which may comprise a centrifugal air pump 11 actuated from the motor 5 through the gears 6 and 12 and drawing from a vacuum tank 11' suspended beneath the platform. The air-exhaust is adapted at predetermined times, as will appear, to communicate with certain other parts of the machine including pneumatic gripper openings in the formers on which the paper rings are coiled. For this purpose air conduits intervene between the air exhacst 11 and the several parts referred to, one of the conduits being indicated at 13 leading from the tank 11' to an air valve associated with the head, or turret, on which the formers are carried, as will hereinafter appear.

Journaled in suitable bearings supported by the platform 3 and the table 1 is a vertically disposed intermittently rotatable shaft 14 having a head, or block, 15 provided with a plurality of horizontally disposed radial arms 16 which are translated in an endless path as the head 15 is rotated by the shaft 14. The shaft 14 extends above its bearing 17 in the table 1, and concentric with this shaft and above bearing 17 is a horizontal bevel gear 18 rotatable relative to the shaft 14. The numerals 19 indicate former-driving bevel pinions, one for each arm, journaled on the arms 16, in mesh with the gear 18 and adapted to roll on the gear 18 as the arms 16 are translated in their endless circular path by rotation of the head 15. In the present embodiment the pinions 19 are fixed to the inner ends of members, shafts, or driving sleeves 20 rotatably mounted on the arms 16, these sleeves carrying at their outer ends formers, or mandrels, 21 which are attached to the sleeves 20 to rotate therewith on the arms 16 and also to be translated therewith around the axis of the shaft 14. To the formers 21 will be applied the paper strips or webs going to make up the article, as a box part, produced by the machine.

In the present embodiment the periphery of each of the formers 21 is generally cylindrical and has a pneumatic-gripper opening 22 adapted to communicate with the air-exhaust 11 via the conduit 13. For this purpose each former is provided with an air passageway 23 communicating with the opening 22, the inner end of the passageway 23 registering with an aperture 24 through the sleeve 20, there being a circumferential air passageway or annular groove 25 in the arm 16 in registry with the aperture 24 and in communication with an air conduit 26 leading through the arm 16 and terminating in a port 27 in the upper face of the head 15. It is to be understood that the formers and the parts for effecting their rotation and controlling the pneumatic-grippers thereof are similar, so that a description of one suffices for all. The ports 27 of the conduits 26 for the several arms 16 are arranged in a circular series in the top of head 15 as illustrated, for instance, in Fig. 13.

Figure 25:
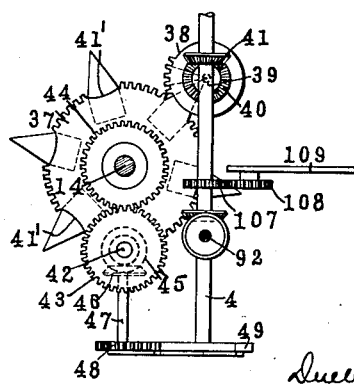
Fig. 25 is a detail of the Geneva mechanism for driving the turret from the main shaft and for driving one of the horizontal gears associated with the turret.

Bearing on the upper face of the head 15 is an oscillatory valve 28 having a segmental air chamber 29 adapted simultaneously to communicate with one or more of the ports 27 and in communication with the air exhaust 11 through the conduit 13, which latter conduit may have a flexible portion to follow the oscillatory movements of this valve. The valve 28 has a part 29' between the ends of the segmental air chamber 29 which closely fits the outer face of the head 15 and is adapted to cut off communication between the air exhaust and one of the ports 27 and maintain simultaneously communication with another of said ports. In the present embodiment six formers 21 are employed and accordingly there are six ports 27 in the head 15. After a multiple-ply paper ring has been formed on a former 21, as hereinafter described, such former with its ring arrives at a sixth station where it is to be discharged. Preliminary to discharge at the sixth station, the pneumatic-grip on the ring is relieved, but the pneumatic gripper of such former is again energized when the former reaches the next, or first station. The valve 28 in one of its oscillatory positions cuts off communication between the air exhaust and the port 27 at the discharging station and simultaneously opens the port 27 leading to the former at the first station. The closing of the port 27 at the discharging station when the port 27 is cut off, it registers with an opening 27' in valve 28, leading to the atmosphere to relieve the vacuum effect and permit the easy removal of the paper ring thereon. The valve 28 is oscillatably mounted upon an extension of the shaft 14 and is pressed against the head 15 by a plate 30 urged toward the head by coil spring 31 abutting this plate and an enlargement or flange 32 on the end of the shaft 14. Oscillatable movement is given the valve 28 through a connecting rod 33, one end of which is pivotally connected to the valve at 34 and the opposite end of which is pivotally connected to one end of a bell crank lever 35, the opposite end of such lever being slotted at 36 and pivotally connected to a properly timed operative part of the machine, in the present instance, to a member which operates a presser finger at the first station, as will appear. The turrent shaft 14 is intermittently rotated and locked in positions of rest by co-operating mutilated gears 37 and 38, the former being fast to shaft 14 below the platform 3, and the latter on the end of a depending shaft 39 extending above the platform 3 and having a bevel pinion 40 driven from a similar pinion 41 on the driving shaft 4. (see Fig. 25). For every revolution of gear 38, the shaft 14 is rotated for one-sixth of a revolution and is locked by the untoothed periphery of the gear 38, co-operating with the concavities 41' in the periphery of gear 37.

Alongside the turret shaft 14 is a parallel shaft 42 having at its upper end a pinion 43 meshing with a pinion 44 fastened to rotate the bevel pinion 18. At its lower end (see Fig. 25) the shaft 42 is provided with a bevel gear 45 in turn meshing with a bevel gear 46 on a horizontal shaft 47 having a mutilated gear 48 driven from a segment gear 49 on the main shaft 4.

It will now be seen that the rotation of the main shaft 4 is communicated to the turret shaft 14 to intermittently rotate the head 15 and effect intermittent translation of all the formers 21 with the arms 16 in an endless path. It will also be seen that the rotation of the main shaft 4 is so communicated to the bevel gear 18 as to cause the latter to intermittently rotate and thereby, through the bevel pinions 19 and sleeves 20, to rotate simultaneously the formers 21 on the arms 16. In the present embodiment the proportions of the several gears relative to each other and the arrangement of the parts is such that the several formers 21 are translated simultaneously and come to rest at the several stations, and that, while at rest, the formers are rotated a plurality of times in order that the strip applied thereto may be coiled into a plurality of plies at the stations where applied. Furthermore it will be observed that, in the illustrative embodiment, the translation of the formers from station to station is effected while the bevel gear 18 is at rest and in mesh with the pinions 19. By this construction the translatory movement of the formers results in the rolling of the pinions 19 on the bevel gear 18 so as to effect a reverse rotation of the formers during their translatory movement. In the present embodiment the relative proportions of the gear 18 and the pinions 19 are such that the formers are simultaneously rotated in one direction two and one-half times while at rest at the stations and are simultaneously rotated in the opposite direction one-half a rotation during translation between the intervals of rest. Thus the mechanism described effects the alternate rotation of the bevel gear 18 and the head 15, and the rotation of the bevel gear 18 between the rolling movements of the pinions 19 thereon as they are translated.

Figure 2:
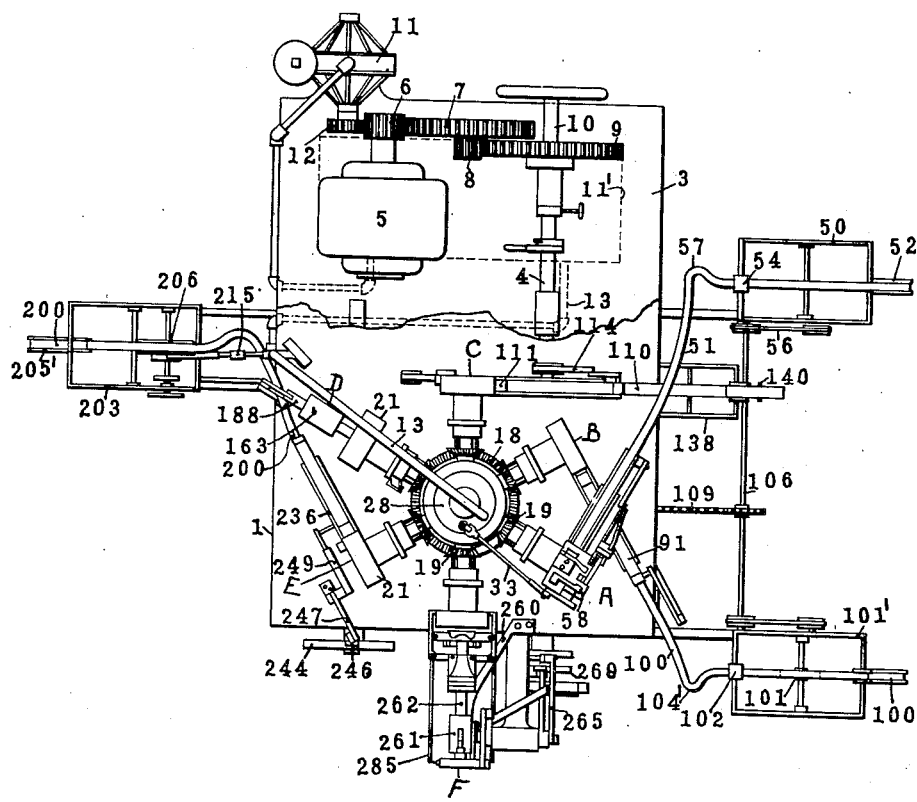
Fig. 2 is a plan view of the machine, parts being broken away or omitted for clearer disclosure of other parts.
Figure 24:
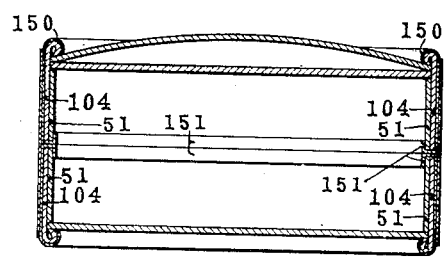
Fig. 24 is a vertical section through a paper box, some of the parts of which may be formed by the machine of the present invention.

As before remarked, the present embodiment provides a six point turret. Operations in the making of the box or box part are performed at each station. For convenience of disclosure the several stations may be referred to as first station, second station, third station, etc., and the several stations are indicated in Fig. 2 of the drawings by the letters A, B, C, D, E, and F, the letter A indicating the first station.

First station: At this station a relatively narrow strip of inexpensive paper, such as "card-middle strip", having a white surface, being a short fibre paper, is glued on one face and one end of this strip applied to the former 21 over the pneumatic-gripper opening 22 whereupon the valve 28 is operated to establish communication between said pneumatic-gripper opening and the air exhaust so as to retain the end of the card-middle strip on the former. Thereupon the former at this station is rotated two and one-half times, by the mechanism hereinbefore referred to, to coil this strip into a multiple-ply paper ring, the ring being pneumatically held to the former until ready to be discharged at the sixth station, F.

The numeral 50 (see Figs. 2 and 38) indicates a glue pot over which the card middle strip 51 passes from a supply roll 52. The numeral 53 indicates a glue roller dipping into the glue in the pot and applying glue to the face of the paper strip 51. The numerals 54 and 55 indicate feed rollers which are positively rotated through suitable belt gearing indicated at 56 and positively advance the strip 51 so as to provide a loop or slack of paper strip as indicated at 57 the strip thence passing to a reciprocatory strip feeding device generally indicated by the numeral 58 in Fig. 1 and shown more in detail in connection with associated devices in Figs. 3 to 8 inclusive. Upstanding from the table 1 adjacent the first station is a bracket 59 having an arm 60. Journaled in the bracket 59 is a cam shaft 61 continuously driven from the main shaft 4 through suitable intermediate mechanism and having three cams 62, 63 and 64 for operating the strip feeding device, the strip applying finger and the strip severing device. The numeral 65 indicates a gripper jaw reciprocal on the arm 60 and reciprocated from the cam 62 through the intermediate cam follower 66. A spring 68' cooperates with the cam 62 to keep the cam follower against the cam. The strip 51 passes over and along the jaw 65 and is gripped to the jaw 65 by a companion gripper jaw 69 pivotally connected to the jaw 65 at the rear end as at 70 and spring pressed toward the jaw 65. Thus as the cooperative gripper jaws 65 and 69 are reciprocated the paper strip is advanced as these jaws advance and an extended end of the strip is applied over the former at the first station. The numeral 71 (Fig. 5) indicates a presser finger being a roller mounted at the lower end of a vertically reciprocatory rod 72 which is lifted by a rod 73 guided in a housing 74 on the side of the bracket 59, the lower end of the rod 73 having a roller 75 which cooperates with the cam 63. A spring 76 cooperates with the cam 63 to effect the descent of the pressing roller 71. As the cam 63 rotates the roller 71 is raised and lowered at proper times and in its descent it contacts with the end of the paper strip 51 and presses it against the former 21 over the pneumatic gripper opening 22. Thereupon the oscillatory valve 28 moves to uncover the air port 27 communicating with the pneumatic gripper opening 22 at the first station, so that the vacuum takes effect and grips the strip 51 to the former. At this time it will be noted that the movement of the air valve closes the port 27 at the sixth or discharging station and permits the ring formed thereon to be readily drawn off. The strip having been pneumatically gripped to the former, as explained, the former is rotated on the arm 16 and the strip coiled thereon into a multiple-ply ring whereupon the strip is severed. The severing is effected by a reciprocatory knife 80 lifted by a cam rod 81 which cooperates with the cam 64, a spring 82 being connected to the knife and to a fixed part so as to effect the rapid descent of the knife at the proper time to sever the strip. In the present embodiment the lower end of the rod 81 directly cooperates with the cam 64 which latter is provided with an abrupt face 83 to permit the sudden descent of the knife to sever the paper strip. As the paper strip is coiled around the former 21 the roller 71 continually presses thereagainst to make a smooth coil and press the layers against each other to obtain efficient adherence of the glued plies. During the coiling of the paper strip at the first station the feed jaws 65 and 69 move backwardly relative to the paper strip and take up a new position ready to advance the strip for the next former after the severing operation.

Second station: The former is brought from the first to the second station by the translation of the arm 16 through rotation of the shaft 14 while the bevel gear 18 is at rest. As the former moves from the first to the second station it rolls on the gear 18 and is thereby, for one-half a rotation, turned in a reverse direction from the direction in which it rotates to coil the strip. Thus the point where the strip was initially applied to the first former is brought to an upper position at the second station and will be in the same relative position relative to this station. At the second station a paper strip is applied to the multiple-ply ring produced on the former at the first station. Preferably, and in the present embodiment, the coiling of the second strip is started at a point diametrically opposite the point where the first strip started. A reciprocatory feed gripper similar to the grippers 68 and 69 employed at the first station may be employed for feeding the strip to be applied at the second station, but, as illustrated, they are positioned to initially apply the second strip at the bottom of the former instead of at the top.

Figure 1:
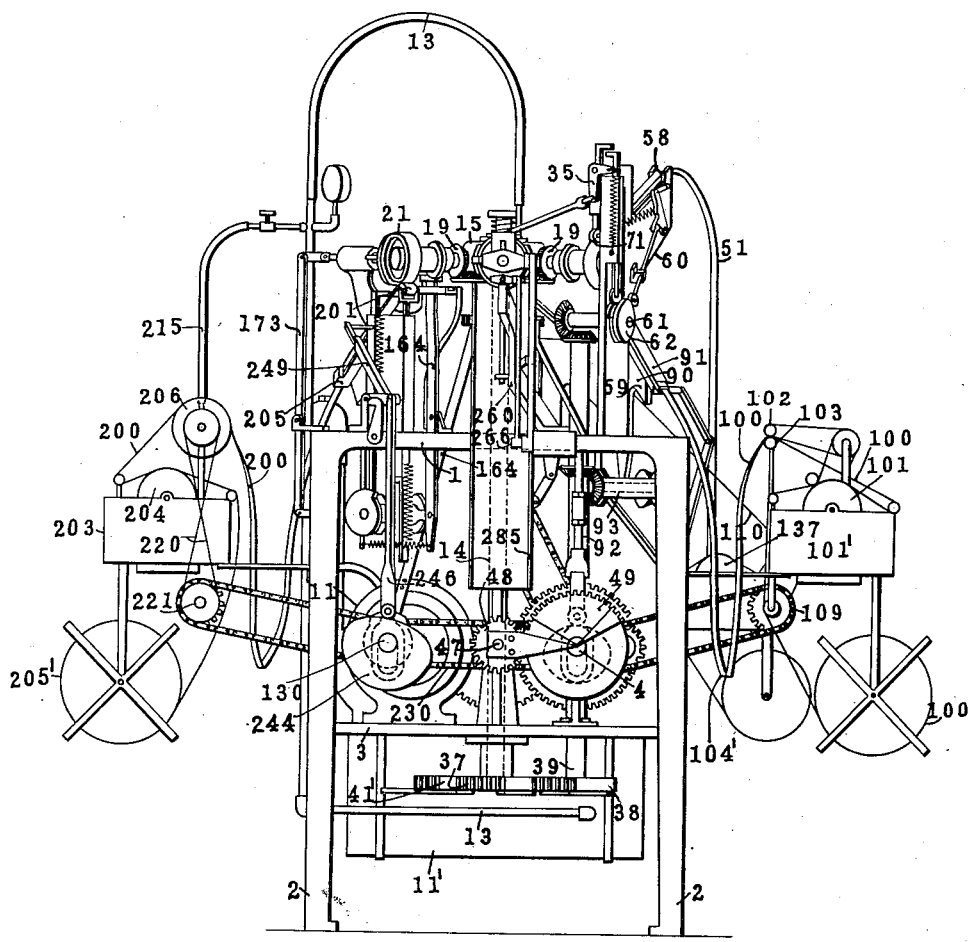

The numeral 90 indicates a bracket upstanding from the table 1 adjacent the second station and acting as a support for the reciprocatory gripper jaws generally indicated by the numeral 91 in Figs. 1 and 41, adapted to feed a paper strip to the underside of the former 21 at the second station. The gripper jaws 91, the operating mechanism therefor as well as the severing mechanism and the pressing roller may be the same as for the first station and need not be further specifically described. They are illustrated in Fig. 41. It may be noted, however, that the cam shaft 61 for the first station is driven from a vertical shaft 92 (Fig. 34) in turn driven from the main shaft 4, and that the numeral 93 indicates a shaft for operating the cam shaft 93', which latter operates the reciprocatory feed device, the severing device and the strip applying roller at the second station, said shaft 93 being likewise operated from the vertical shaft 92 and lying beneath the table 1.

Figures 29, 30, 31:
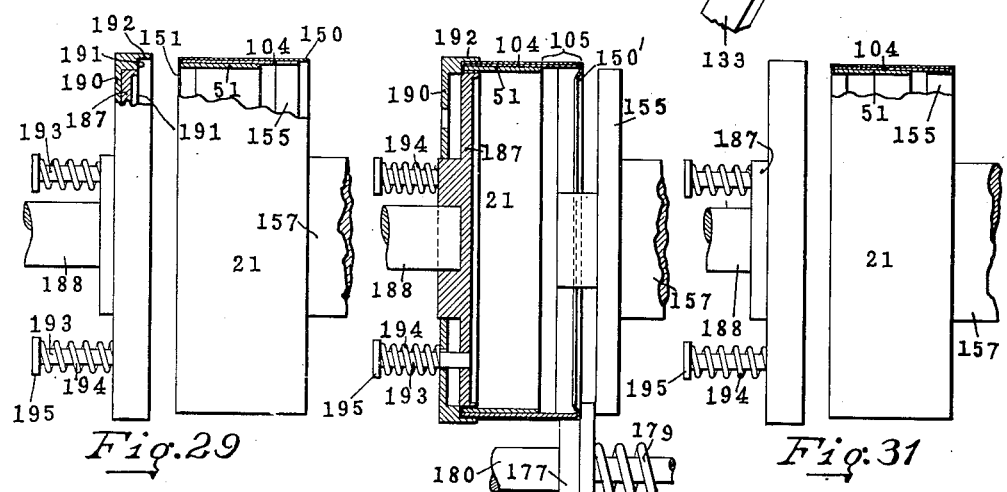
Figure 32:
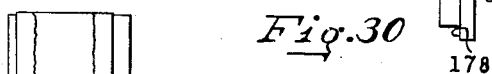

The strip applied at the second station is preferably of tough, durable material, as, for instance, provided by craft paper which has a long fiber. It comes from a roll of craft strip 100 (see Fig. 1) and passes over a moistener roller 101 which dips in a water pot 101' and thence over co-operative positively driven feed rollers 102 and 103, being drawn over the moistener roller 101 by these feed rollers so as to provide a slack or loop 104', the end of which enters the reciprocatory feed grippers 91. Preliminarily to utilizing the craft strip in the machine, one of its faces is sized over all with animal sizing and the sizing allowed to dry. After it is dry it is coiled into the supply roll, indicated at 100, and drawn over the moistener roller 101 which latter is disposed to moisten the sizing for a part width of the craft strip and leave the remaining width of sizing dry. (See Fig. 39.) Reference being made to Fig. 30, the first, or card middle strip, in ring form is diagrammatically illustrated at 51, surrounding the mandrel 21. The craft strip, diagrammatically illustrated at 104, is applied at the second station so as to be flush with the left hand end of the strip 51 (Fig. 30) whereas it overlaps the strip 51 on the right hand side, the overlapped portion being indicated at 105. The moistening of the sizing of the craft strip by the roller 101 moistens that part which is within the width of the first strip 51, the extended part 105 being consequently dry. It will be understood that when the craft strip, moistened at the part referred to, is applied to the ring of card middle strip at the second station, its end will be pressed against the previously applied paper ring and caused to adhere thereto by the pressing roller, or finger, for this station, and the former 21 will be rotated a plurality of times so as to coil the craft strip into a multiple-ply ring closely associated with and adhering to the first applied ring, the plies of craft strip also adhering to each other for a part of their width and being substantially non-adherent at the extended portion. Thereupon the craft strip will be severed and the feed device 91 will have returned to position to effect a new supply of partly moistened craft strip. The strip gluing and moistening devices for the first and second stations may be alike in construction, and the pairs of feed rollers 54, 55 and 102, 103 may be driven from a single shaft 106, in turn driven from the main driving shaft 4, through gears 107, 108 and chain 109. (Figs. 2 and 38.)

Third station: To bring the former 21, surrounded by the two multiple-ply rings, to the third station, the turret shaft 14 will again be turned. At the third station the present embodiment of the invention provides for the application of a thin strip, preferably of an ornamental character, which may be utilized to bind the edges of the multiple-ply rings already formed and finish one or both of such edges. The direct application of the thin covering and binding strip to the paper rings at the third station may be accomplished by a feed device generally similar to that described for the first station. Reference being made to Fig. 9, the covering and binding strip coming from the supply of such strip is indicated at 110, entering between gripper jaws 111 and 112 similar to the jaws 65 and 69. There is also seen the former 21 with the two multiple-ply rings thereon. The feed jaws 111 and 112 are reciprocated through the instrumentality of a link 113, a rock lever 114 fulcrumed at 115 and a cam follower 116, the latter cooperating with the cam 117 on the cam shaft 118 and being drawn against the cam by a spring 119. Two other cams 120 and 121 are provided on the shaft 118, one of these cams cooperating with a cam roller 122 at the end of a vertically reciprocatory rod 123 carrying the pressing roller, or finger 124, and another of these cams cooperating with a vertically reciprocatory rod 125 at the upper end of which is a knife 126 adapted to overlie the cover strip 110, the cam for the knife having a notch 127 to permit the sudden descent of the knife 126 to sever the strip 110. Suitable springs 128 and 129 are employed to keep the rods 123 and 125 in cooperative relation with the two cams. The cam shaft 118 may be driven from the main shaft 4 by a sprocket chain, as illustrated in Fig. 9, and an auxiliary cam shaft 130 may also be driven from the main shaft 4 by a sprocket and chain as illustrated in the same figure. On the auxiliary shaft 130 is a cam 131 cooperating with a cam roll 132 on a rod 133 to the upper end of which is pivoted a bell crank lever 134 having a folding roller 135 adapted to be moved into and out of the translatory path of the formers 21 and to fold one side of the cover strip across one edge of the multiple-ply rings as the former 21 is rotated at the third station. A spring 133′ connected to the rod 133 and to the frame of the machine assists in keeping the roller 132 in contact with the cam 131. The cover and binding strip 110 may be supplied from a roll of such material (see Fig. 11), the strip 110 first passing over a glue roller 137, receiving glue from pot 138, thence over a scraper 139 and thence in operative relation to an ironing device, and thence to between the feed jaws 111 and 112.

When a thin covering strip is employed it may have a tendency to curl and twist and the most efficient operation renders it desirable to prevent such curling and twisting in order that the strip may be applied to the former in proper position and coiled on the previously wound strips in a smooth and sightly manner free from blisters and puckers. To this end there is provided a device movable on the strip in rear of the feeding elements and adapted to iron the strip. In the present embodiment this ironer (Figs. 11 and 42) is positioned between the reciprocatory feed grippers and the gluer and comprises an ironing bar 140 transversely spanning the strip 110, this bar being preferably a bar-like roller, as illustrated in Fig. 42. The numeral 141 indicates an arm pivoted to a fixed part, as the pot 138, at 142, and carrying the ironer at a distance from the pivot 142, the ironer contacting with the unglued face of the strip, a spring 143 being employed to rotate the arm 141 in a direction opposite to the direction of the movement of the ironer under the pull of the strip 110 as the strip is fed. It will be understood that the cover strip 110, after passing over the guide roller 142′; glue roller 137, and guide roller 143′ extends over the ironing bar 140 and thence to between the reciprocatory feed grippers 111 and 112 which apply the end of it to the paper rings on the mandrel at the third station, the spring 143 opposing the pull of the feeding grippers and looping the strip as well as ironing it, a position in which the ironer loops the strip being illustrated in Fig. 11. During the ironing operation recession of the cover strip 110 from the feed means is prevented, as by a strip arresting dog 144 (Figs. 9 and 43) which is pivoted to a pendant 145 connected to the upper feed jaw 111, the dog 114 having a roughened or toothed under-face to contact with the face of the cover strip 110 so as to arrest recession of the strip from the feed device but freely to permit the strip to be drawn past the dog by rotation of the former 21, the dog 144 being movable with the strip feeder. As the feed device operates to advance the end of the cover strip 110 to the former, the ironer 140 moves with the strip in the direction of the arrow (Fig. 11) around the pivot 142. When the feed ceases the spring 143 becomes a yielding means to urge the ironer 140 in a direction to loop the strip and retrograde motion of the ironer not only wipes the strip and irons the same but pulls some of the strip past the glue roller 137 from the supply 136. The ironer is preferably relatively light in construction and the spring 143 such as to maintain the ironer closely in contact with the strip throughout the feed of the strip so as to maintain some tension on the strip 110 between the ironer and the feed device and at the same time provide a loop of strip which has but a slight tension and may be readily taken up by the rotation of the former in coiling the strip on the rings previously formed.

The cover strip 110 is preferably sufficiently wide to project at each side of the ring of craft strip, the projecting sides to be folded around the respective adjacent edges of the underlying rings so as to enclose the laminated edges and bind them together. In Fig. 29 the cover strip is illustrated projecting in an unfolded condition at 150 at the right hand side of the craft ring 104; at the left hand side the cover strip, at 151, is shown folded across the edges of the two underlying rings. The folding of the cover strip at the left hand side is effected at the third station by means of the folding roller 135 which is projected by the cam 131 across the edge of the underlying rings and folds one side of the cover strip across such edges as the cover strip is coiled by rotation of the mandrel 21. After coiling at the third station, the cover strip is severed by the knife 126.

Figure 13:
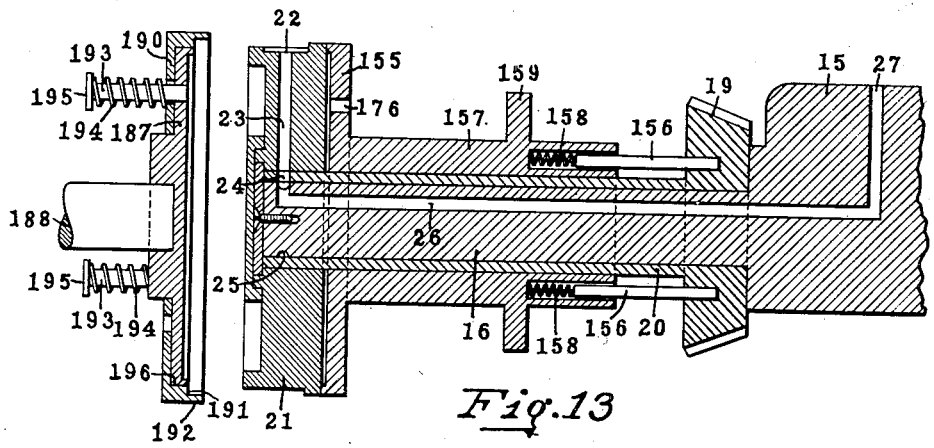
Fig. 13 is an enlarged vertical section through one of the turret arms and its former, and a folding device at the fourth station.
Figure 14:
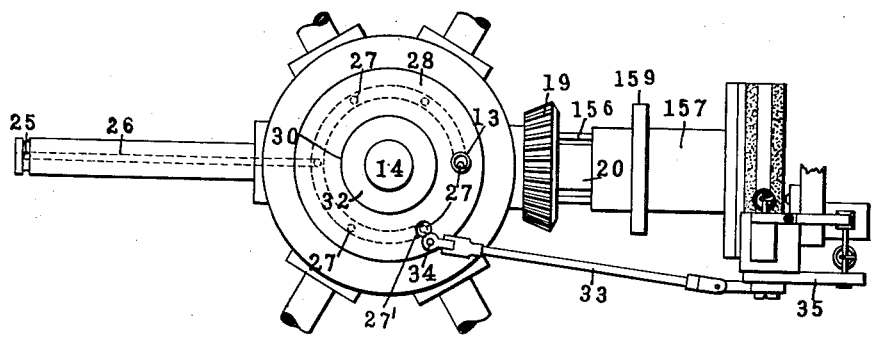
Fig. 14 is a plan view illustrating an air controlling valve associated with the turret, together with the operating devices for this valve.
Figure 15:
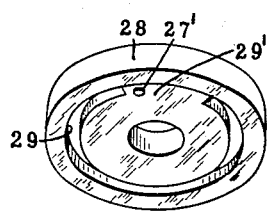
Fig. 15 is a perspective detail view of such valve.
Figure 26:
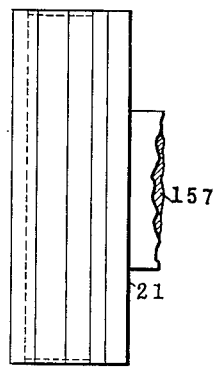
Figure 27:
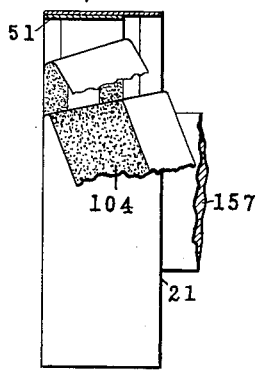
Figure 28:
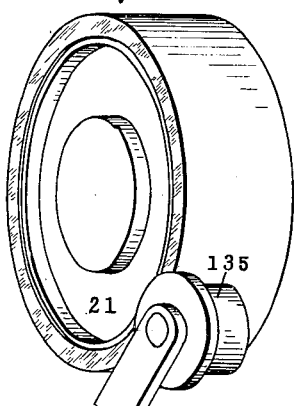

Fourth station: From the third station, where the cover strip is applied, the three concentric rings pass with the former to the fourth station where the previously folded edge 151 of the cover strip is folded into and against the inner face of the first coiled ring and where the extended edge 150 of the cover strip is folded around the edge of the craft strip ring. Rotatably and axially movable on the driving sleeves 20 of each former are inner folders, as the discs 155, concentric with the formers 21. The peripheries of the folding discs 155 are flush with the adjacent periphery of the formers 21 and when abutting the formers, as seen in Fig. 13, act as former-sections at one side of the formers. In order to rotate the folders 155 simultaneously with the formers 21 and permit axial movement of these folders to and from the formers the pinions 19 are provided with pins 156 rotatable therewith which pins fit openings in the hub 157 of the folder 155, springs 158 in said openings cooperating to press the folder 155 toward the former, and the pins co-operating to positively rotate the folder 155 with the former. The numeral 159 indicates a collar on the hub 157 engaged between two anti-friction rolls 160 and 161 (Fig. 16) on a sliding head 162 reciprocatably mounted on a bracket 163 upstanding from the table 1 and the head 162 is moved in one direction or the other through the instrumentality of a rock lever 164 fulcrumed on the table at 165 and having an anti-friction roll 166 co-operating with the cam 167 on a shaft 168 journaled in a hanger 169. A spring 170 connected to the end of the lever 164 tends to keep the roller 166 in contact with its cam, and co-operates with the cam to withdraw the inner folder from the former. On the shaft 168 is another cam which co-operates with a cam roll 171 on a rod 172 pivotally connected to another rock lever 173 in turn connected by a link 174 to a yoke 175. It will be understood that as the turret arms 16 are translated by rotation of the head 15 the collars 159 on the inner formers 155 arrive between the anti-friction rolls 160 and 161 at the fourth station so as to be operated by the rock lever 164 when at the latter station. When the folder 155 is a solid disc, as illustrated, it may be pierced by an opening 176 to relieve any vacuum grip which might occur at this point between the face of the former and this folder.

When the folder 155 is spaced from the face of the former 21 a folding finger or roller 177 is moved into position between the former 21 and the folder 155 into contact with the projecting edge of the cover strip so that as the former is rotated at the fourth station the cover strip is folded across the adjacent edge of the craft strip ring throughout its periphery. In the present embodiment the roller 177 has a right angle shoulder 178 exceeding in depth the thickness of the multiple-ply ring at this end and is spring pressed axially toward the former by a spring 179. The roller 177 may be mounted upon a shaft 180 carried by a yoke 181 at the end of a vertically movable bar 182 having at its lower end a cam roller 183 co-operating with a cam 184 on the shaft 168, a spring 186 being employed to keep the roller 183 in contact with its cam.

At the fourth station, at the opposite side of the former 21 from the folder 155, is an outer folder 187 movable toward and from the adjacent face of the former. The periphery of the folder 187 conforms to that of the inner paper ring and is adapted to nicely fit therein. As illustrated the outer folder 187 is a plate connected to the end of a rotatable shaft 188 axially rotatably connected to the yoke 175 through the instrumentality of the pin 189, the shaft 188 rotating and moving longitudinally in a bearing in the bracket 163. Carried by the folding plate 187 is a plate 190 having a face 191 directly opposite the edge of the several paper rings on the former and also having an annular wall portion 192 adapted to take up a position opposite the edge of the folding plate 187. The presser plate 190 is spring pressed toward the plate 187 in the direction of the former 21 through the instrumentality of pins 193 projecting from the plate 187 through openings in the presser plate 190 springs 194 being interposed between the presser plate 190 and heads 195 on the pins 193. The presser plate 190 is recessed, as at 196, for the reception of the folding plate 187 under the influence of the springs 194.

Having arrived at the fourth station the collar 159 takes up its position between the anti-friction rolls 160 and 161 and the former is rotated by rotation of the bevel gear 18. The folding disc 155 recedes from the face of the former 21 and the folding roller 177 rises and enters this space. As the former rotates the extended edge 150 of the cover strip will be folded across the edge of the craft paper ring, being pressed closely against the edge of such ring, following even slight irregularities in such ring on account of the roll 177 being spring pressed toward its work. The edge 150 of the cover strip having been folded as just stated the folder 155 returns to its position against the former 21 thus reentering the craft strip ring and folding the edge of the cover strip into and against the inner wall of such ring. The cover strip being glued on its inner face will adhere to the inner face of the craft strip ring. At the opposite side of the former the folding ring 187 will be advanced by the rock lever 173 and will fold the turned in edge 151 of the cover strip ring into and against the inner wall of the ring of card middle strip paper (Fig. 30). As the folder 187 enters the ring of card middle strip the supporting wall 192 of the plate 190 will take up a position on the outside of the inner strip opposite the edge of the folding plate 187. The face 191 will contact with the covered edge of the rings and press this edge. When the face 191 comes into contact with the edge of the rings its movement will be arrested and further movement of the folding plate 187 permitted to the extent desired and so as to yieldingly press the plate 190 against the edge of the rings. The folding and pressing operations at the fourth station are effected while the former 21 rotates, the outer folder 187 and the presser carried thereby being freely rotatable and being rotated by the rotary movement of the former. As the plate 187 withdraws from the ring, the plate 190 will keep the ring on the former and prevent its withdrawal with the plate 187.

Fifth station: From the fourth station the covered and bound ring assemblage may move to a fifth station where an additional strip may be applied around the cover strip ring. In the present embodiment the strip applied at the fifth station is made up of a series, or lengths, of strip sections lapped and glued together to provide a sufficient supply.

In Figs. 1 and 2 the strip for the fifth station is indicated at 200, being looped downwardly as illustrated and then carried upwardly to reciprocatory feed grippers which are similar in construction to the reciprocatory feed grippers for the first station. Also at this station is a presser roller 201 and a strip severing device 202 operated in a similar manner to the similar respective devices at the third station. It may be noted, however, that provision may be made for varying the feed throw of the reciprocatory grippers for feeding the strips at the fifth station. The numeral 203 indicates a glue pot into which dips a glue roller 204. A supply of lapped strip sections forming the strip 200 may be taken from a roll 205' of such material and after passing over the glue roller 204 will be led to the feed grippers 205 for the fifth station. Between the glue roller 204 and the feed grippers 205 the glued and lapped strips may pass over a pneumatic strip feeding wheel. This wheel, indicated at 206 (Fig. 20), has a series of circumferentially related pneumatic gripper openings 207, in its periphery, and separate air conduits 208 leading from the openings 207 to a plurality of ports 209 in the face of the wheel 206. The numeral 210 indicates a bracket supporting a rotary shaft 211, to which the wheel 206, having the hub or extension 212, may be keyed, or the wheel and its hub and shaft may be cast in one piece abutting the face of which 206 is a plate 213 having an air chamber 214 in communication with some of the ports 209, the unchambered part of plate 214 serving to close certain of the ports 209. The air chamber 214 communicates with the air exhaust or air pump 11 via the air conduit 215 and other suitable conduits leading to said exhaust. The plate 213 is loose on hub 212 and pressed against the ported face of wheel 206 by spring 217, abutting the collar 218 pinned to hub 212. To restrain rotary movement of plate 213, it carries a headed pin 218' which is loosely engaged by an arm 210' of bracket 210.

From the glue applying wheel 204 the strip 200 passes over the upper part of the strip feeding wheel 205 and is guided by the flanges 219 of said wheel. The air chamber 214 is so disposed that as the wheel 206 rotates communication is established between the air exhaust 11 and the pneumatic gripper openings which are at the upper part of the wheel and underlie the bight of the strip 200 on the wheel, the other peripheral pneumatic gripper openings of the wheel 206 being cut off from communication with the air exhaust by the imperforate portion of the plate 213 sealing the ports 209 from communication with the lower part of the periphery. The wheel 206 is continuously rotated by means of the cross belts 220 from a shaft 221 in turn rotated from a suitable continuously operating part of the machine. Thus as the wheel 206 rotates the strip passing thereover is pneumatically gripped and thereby fed by the rotation of the wheel and additional strip material is pulled from the supply 205' over the glue wheel 204.

The construction for feeding, severing, and applying the strip 200 at the fifth station is illustrated in more detail in Fig. 45. At the upper part of the figure appears the former 21 with the end of the strip 200 applied to the previously wound strip and pressed thereagainst by the finger, or roller 201. At the lower part of the figure appears the auxiliary shaft 130 which is parallel to the main driving shaft 4 and driven therefrom through the chain 230 (Fig. 9). At the intermediate portion of Fig. 45 appears the cam shaft 168 which is driven from the shaft 130 through the instrumentality of the bevel gears 231, 232, 233, 234. On the shaft 168 is a cam 235 for operating the cutter 202 for the fifth station, this cutter being at the upper end of a vertically reciprocatory rod or plate 202' guided in a bracket 236 upstanding from the table 1 adjacent the fifth station. The lower end of this cutter rod cooperates with the cam 235 and is drawn against the cam by a spring 237 so as to effect the severing of the strip when the abrupt face 238 of the cam 235 permits. The applying and pressing roller 201 is carried at the upper end of a rod 239 which latter reciprocates vertically in the bracket 236 and passes through the table 1. Beneath the table 1 and connected to the rod 239 so as to form a part thereof is an extension rod 240 having a cam roller 241 which cooperates with the cam 242 on the shaft 130 to give proper movement to the roller 201, this movement being the same as for the pressing rollers at the other stations. A spring 242' connected to a pin 243 on the machine frame and to the rod 239 serves to keep the roller 241 against its cam 242. For reciprocating the feed grippers 205 for the fifth station the shaft 130 carries a cam 244 which cooperates with a cam roll 245 on a rod 246, the upper end of which is connected through the arm 247 to a rock shaft 248 having an arm 249, the outer end of which is connected to the lower gripper of the jaws 205 through the link 250. As the cam 244 rotates the grippers 205 are reciprocated and advance the strip 200 at intervals. In order to vary the throw of the grippers 205 the arm 249 includes a section 251 which may be longitudinally adjusted relative to the part 249. The section 251 slides in the part 249 and has a rack 252 engaged by a pinion 253 journaled on the arm 249. At 254 is a handle for operating the pinion 253 and adjusting the rod 251 in or out relative to the arm 249. A tooth on handle 254 may engage a toothed segment 255 to maintain the adjustment of rod 251.

From the fifth station the formers arrive at the sixth station where the composite paper ring is stripped or discharged from the machine. Referring to Figs. 36 and 37 there is illustrated an upstanding bracket 260 fastened to the table 1 and having a horizontal bearing piece 261 in which reciprocates a shaft 262, the outer end of the shaft having a head 263 to which is pivotally connected a link 264 in turn connected to the upper end of an arm 265 of a rock shaft 266 having an arm 267 operated by a cam 268 on the main driving shaft 4 through the instrumentality of connecting rod 269 and cam roll 270. The inner end of the shaft 262 carries a cross piece 271 at the opposite ends of which are pivoted the ring-discharging or stripping jaws 272, these jaws being pivoted intermediate their ends to the cross piece 271 and connected by links 273 to a head 274 slidable along shaft 262. Also connected to the head 274 is a rod 275 slidably mounted in the bracket 260, the outer end of the rod 275 being linked to a rock arm 276 on a rock shaft 277 concentric with the rock shaft 266, said shaft 277 having an arm 278 to which is connected rod 279 having a cam roller 280 co-operating with a cam 281 on the main driving shaft 4. The numeral 282 indicates a spring, one end of which is connected to the bracket 260 and the other end to the rock arm 265, this spring tending to keep the cam roll 270 in co-operative relation with its cam. At 283 is a spring connecting the arms 265 and 276 whereby the cam roll 280 is kept in co-operative relation with the cam 281 through the tension of the spring 282. As the cams 268 and 281 rotate the shaft 262 advances toward the former 21, the jaws 272 being in open position so as to pass over the paper ring to position in rear of said ring. Thereupon the head 274 is moved rearwardly by its cam so as to cause the jaws 272 to approach the former and come in contact therewith in rear of the paper ring by a pivotal movement on the cross piece 271. Then the cams 268 and 281 cause the shaft 262 to recede while the jaws 272 are kept in position practically in contact with the former and caused to recede with the shaft 262. In this wise the paper ring is stripped or discharged from the former 21 and falls into the chute 285 (Fig. 1) for guiding it away from the machine. As the ring is drawn from the former it may be held against an abutment 284 on the shaft 262 so as to be spaced from the machine before being released from the discharging device. As the jaws 272 take up a position remote from the former, they open and will then release a ring which may be held therein.

The folding rollers 135 and 177 each has a right-angle shoulder, illustrated at 178 for the roller 177. When the binding strip 110 is folded across the edges of the paper multiple-ply or body-ring by the rollers 135 and 177, the folded edge of the cover strip gathers or puckers, due to the decreased diameter of the circle occupied by its edge. The shoulders referred to press the folds of the cover strip closely against the edges of the multiple-ply ring, and the gathers or puckers thereupon take up a position pointing inwardly of the multiple-ply ring as illustrated at 150′ in Fig. 30 and at 151 in Fig. 29. In this wise the tendency of the folded edges of the cover strip to part from the edges of the multiple-ply ring is lessened, and the fold is maintained against the edges of the multiple-ply ring so that an effective bound edge results after the folding elements 155 and 187 have operated.

Thus by the above described construction are accomplished, among others, the objects hereinbefore referred to. It will be noted that the present invention provides for the rapid and continuous manufacture of paper rings from relatively inexpensive thin paper, the thin material being coiled or wound to provide rings thicker than the paper strip. In this wise stiff box parts may be made from flexible paper strips. Whereas multiple-ply rings of a certain thickness are made by the machine described herein, it will be apparent that by increasing the number of rotations of the formers at the stations and varying the feeding, cutting, and strip applying mechanisms to accord therewith, multiple-ply rings of greater thickness may be made without departing from the purview of this invention. The invention is especially adapted for the making of multiple-ply rings in which the plies adhere for only a part of the width of the ring so that the ring product may be efficiently utilized in subsequent operations, such as crimping. The non-adhering portions of the multiple-ply ring lends itself especially to an efficient crimping operation and permits said operation to be performed rapidly and efficiently, the crimp being smooth and the paper, including the sizing, rapidly setting in crimped position and holding such position. Hence a large output may be realized by the present machine.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is—

1. In an apparatus of the character described, in combination, a rotatable and translatable former having a pneumatic-gripper opening, an air-exhaust, and intervening air-conduits.

2. In an apparatus of the character described, in combination, a translatable arm having a circumferential air-passageway, a former rotatably mounted on said arm having a pneumatic-gripper opening in communication with said passageway, an air-exhaust and air-conduits between said passageway and said air-exhaust.

3. In an apparatus of the character described, in combination, a translatable arm having a circumferential air-passageway, a sleeve rotatably mounted on said arm, having an aperture in registry with said air-passageway, a former connected to rotate with said sleeve having a pneumatic-gripper opening communicating with said aperture, an air-exhaust and air-conduits between said passageway and said air-exhaust.

4. In an apparatus of the character described, in combination, a plurality of rotatable and translatable formers having pneumatic-gripper openings, an air-exhaust, and intervening air conduits including an air-chamber adapted to simultaneously communicate with the pneumatic-gripper openings of a plurality of said formers.

5. In an apparatus of the character described, in combination, a plurality of translatable arms having circumferential air-passageways, sleeves rotatably mounted on said arms having apertures in registry with said air-passageways, formers connected to rotate with said sleeves having pneumatic-gripper openings communicating with said apertures, an air-exhaust, and air-conduits between said air-exhaust and said passageways including an air chamber adapted to simultaneously communicate with a plurality of said passageways.

6. In an apparatus of the character described, in combination, a plurality of rotatable and translatable formers having pneumatic-gripper openings, an air-exhaust, an oscillatory valve having an air-chamber in communication with said air-exhaust, and conduits adapted to lead from said pneumatic-gripper openings to said air-chamber, said valve including a part adapted, simultaneously, to cut off communication between said air-exhaust and the pneumatic-gripper opening of one of said formers and maintain communication with another of said pneumatic-gripper openings.

7. In an apparatus of the character described, in combination, a plurality of rotatable and translatable formers having pneumatic-gripper openings, an air-exhaust, an oscillatory valve having an air-chamber in communication with said air-exhaust, conduits adapted to lead from said pneumatic-gripper openings to said air-chamber, said valve including a part adapted, simultaneously, to cut off communication between said air-exhaust and the pneumatic-gripper opening of one of said formers and maintain communication with another of said pneumatic-gripper openings, a strip feeding device including a reciprocatory finger adapted to press the strip toward the pneumatic-gripper opening of one of said formers, and means operatively connected to said finger for oscillating said valve.

8. In an apparatus of the character described, in combination, a plurality of rotatable and translatable formers having pneumatic-gripper openings, a strip feeding device including a reciprocatory finger adapted to press the strip toward the pneumatic-gripper opening of one of said formers, means adapted to discharge another of said formers, an air-exhaust, an oscillatory valve having an air-chamber in communication with said air-exhaust, and conduits adapted to lead from said pneumatic-gripper openings to said air-chamber, said valve including a part adapted, simultaneously, to cut off communication between said air-exhaust and the conduit leading to the former being discharged and establish communication between said air chamber and the conduit leading to said former being fed with strip.

9. In an apparatus of the character described, in combination, a plurality of rotatable and translatable formers having pneumatic-gripper openings, a strip feeding device including a reciprocatory finger adapted to press the strip toward the pneumatic-gripper opening of one of said formers, means adapted to discharge another of said formers, an air-exhaust, an oscillatory valve having an air-chamber in communication with said air-exhaust, and conduits adapted to lead from said pneumatic-gripper openings to said air-chamber, said valve including a part adapted, simultaneously, to cut off communication between said air-exhaust and the conduit leading to the former being discharged and establish communication between said air-chamber and the conduit leading to said former being fed with strip, and means operatively connected to said finger to oscillate said valve.

10. In an apparatus of the character described, in combination, a rotatable head having a plurality of arms, said arms having circumferential air-passageways and conduits leading from said passageways and terminating in a series of ports in said head, driving sleeves rotatable on said arms having apertures in communication with said passageways, formers rotatable with said sleeves having pneumatic-gripper openings in communication with said apertures, a valve oscillatable on said head having a chamber adapted to register with a plurality of said ports and a part adapted to simultaneously close one of said ports, and an air-exhaust in communication with said air-chamber.

11. In an apparatus of the character described, in combination, a rotatable head having a plurality of arms, said arms having circumferential air-passageways and conduits leading from said passageways and terminating in a series of ports in said head, driving sleeves rotatable on said arms having apertures in communication with said passageways, formers rotatable with said sleeves having pneumatic-gripper openings in communication with said apertures, a valve oscillatable on said head having a chamber adapted to register with a plurality of said ports and a part adapted to simultaneously close one of said ports, an air-exhaust in communication with said air-chamber, pinions fixed to said sleeves, a gear with which said pinions mesh, means to simultaneously translate said pinions intermittently while in mesh with said gear, and means to intermittently rotate said gear.

12. In an apparatus of the character described, in combination, a former, means adapted to translate said former intermittently, and means adapted to rotate said former in one direction between the intervals of translation.

13. In an apparatus of the character described, in combination, a former, means adapted to translate said former intermittently, and means adapted to rotate said former in one direction between the intervals of translation, and in the opposite direction between the intervals of rest.

14. In an apparatus of the character described, in combination, a former, a pinion attached thereto, means adapted to translate said former intermittently, an intermittently rotatable gear with which said pinion meshes and along which it rolls during translation of said former, and means adapted to rotate said gear between the intervals of translation of said former.

15. In an apparatus of the character described, in combination, an intermittently rotatable bevel gear, a bevel pinion adapted to mesh with said gear, a former to which said pinion is fixed, means adapted to cause said pinion to roll on said bevel gear between intervals of rotation of the latter and means adapted to rotate said bevel gear between the intervals of rolling of said pinion.

16. In an apparatus of the character described, in combination, a shaft having a radial arm, a sleeve rotatable on said arm, a former attached to rotate with said sleeve, a bevel pinion fixed to said sleeve to rotate the same, a gear concentric with said shaft and rotatable relative thereto, said pinion meshing with said gear, means adapted to intermittently rotate said shaft and means adapted to rotate said gear between intervals of rotation of said shaft.

17. In an apparatus of the character described, in combination, a shaft having a radial arm, a sleeve rotatable on said arm, a former attached to rotate with said sleeve, a bevel pinion fixed to said sleeve to rotate the same, a gear concentric with said shaft and rotatable relative thereto, said pinion meshing with said gear, means adapted to intermittently rotate said shaft and means adapted to rotate said gear between intervals of rotation of said shaft, and a combined former-section and folder rotatable with said sleeve movable toward and from said former.

18. In an apparatus of the character described, in combination, a horizontally rotatable bevel gear, a head concentric to said bevel gear and horizontally rotatable relative thereto, a plurality of radial arms on said head, sleeves rotatable on said arms, said sleeves having bevel pinions in mesh with said bevel gear, formers rotatable with said sleeves, and means adapted alternately to rotate said head and said bevel gear.

19. In an apparatus of the character described, in combination, a horizontally rotatable bevel gear, a head concentric to said bevel gear and horizontally rotatable relative thereto, a plurality of radial arms on said head, sleeves rotatable on said arms, said sleeves having bevel pinions in mesh with said bevel gear, formers rotatable with said sleeves, means adapted alternately to rotate said head and said bevel gear, said formers having pneumatic-gripper openings, an air-exhaust, intervening air-conduits between said pneumatic-gripper openings and said air-exhaust including an air-chamber adapted to communicate with said pneumatic-gripper openings through conduits in said head and arms, and a valve adapted to be actuated to open and close communication between one or more of said pneumatic-gripper openings and said air-chamber.

20. In an apparatus of the character described, in combination, a rotatable former, a rotatable folder concentric with said former, means to simultaneously rotate said former and folder, and means to move said folder axially toward and from said former.

21. In an apparatus of the character described, in combination, a rotatable former, a rotatable folder, concentric with said former, means to simultaneously rotate said former and folder, and means to move said folder axially toward and from said former, said first mentioned means including a rotatable member to which said former and folder are connected for rotation therewith.

22. In an apparatus of the character described, in combination, a rotatable former, a rotatable folder concentric with said former, means to simultaneously rotate said former and folder, means to move said folder axially toward and from said former, said second mentioned means including a reciprocatory member for axially moving said folder in one direction, and a spring for moving it in the opposite direction.

23. In an apparatus of the character described, in combination, a rotatable former, a rotatable folder concentric with said former, means to simultaneously rotate said former and folder, means to move said folder axially toward and from said former, said first mentioned means including a rotatable member to which said former and folder are connected for rotation therewith, said second mentioned means including a reciprocatory member for axially moving said folder in one direction, and a spring for moving it in the opposite direction.

24. In an apparatus of the character described, in combination, a rotatable former, a rotatable folder concentric with said former, means to simultaneously rotate said former and folder, means to move said folder axially toward and from said former, said first mentioned means including a rotatable sleeve with which said former rotates and on which said folder is axially movable, a pinion to rotate said sleeve, and connections between said folder and sleeve adapted to rotate said folder and permitting axial movement of said folder.

25. In an apparatus of the character described, in combination, a rotatable former, a rotatable folder concentric with said former, means to simultaneously rotate said former and folder, means to move said folder axially toward and from said former, said first mentioned means including a rotatable sleeve with which said former rotates and on which said folder is axially movable, a pinion to rotate said sleeve, and connections between said folder and sleeve adapted to rotate said folder and permitting axial movement of said folder, said connections including pins on said pinion fitting openings in said sleeve and springs cooperative with said pins to press said folder toward said former.

26. In an apparatus of the character described, in combination, a rotatable former, a rotatable folder concentric with said former, means to simultaneously rotate said former and folder, means to move said folder axially toward and from said former, and a folding finger adapted to move into and out of position between said rotatable folder and said former.

27. In an apparatus of the character described, in combination, a rotatable former, a rotatable folder concentric with said former, means to simultaneously rotate said former and folder, means to move said folder axially toward and from said former, a folding finger adapted to move into and out of position between said rotatable folder and said former, and resilient means adapted to press said folding finger toward said former.

28. In an apparatus of the character described, in combination, a rotatable and translatable shaft, a former rotatable with said shaft, a folder concentric with and axially movable on said shaft toward and from said former, means adapted to rotate said folder from said shaft simultaneously with said former, and means adapted to translate said shaft.

29. In an apparatus of the character described, in combination, a rotatable and translatable shaft, a former rotatable with said shaft, a folder concentric with and axially movable on said shaft toward and from said former, means adapted to rotate said folder from said shaft simultaneously with said former, including a gear, a pinion on said shaft meshing with said gear and adapted to roll on said gear, and means adapted to rotate said gear intermittently.

30. In an apparatus of the character described, in combination, a rotatable and translatable shaft, a former rotatable with said shaft, a folder concentric with and axially movable on said shaft toward and from said former means adapted to rotate said folder from said shaft simultaneously with said former, and means adapted to translate said shaft between intervals of rotation of said gear.

31. In an apparatus of the character described, in combination, a former, a folder movable toward and from the face of said former, a presser movable with said folder, and means permitting arrest of said presser during movement of said folder toward said former.

32. In an apparatus of the character described, in combination, a former, a folder movable toward and from the face of said former, a presser movable with said folder, and means permitting arrest of said presser during movement of said folder toward said former, said presser having a supporting wall opposite the edge of said folder.

33. In an apparatus of the character described, in combination, a former, a folder movable toward and from the face of said former, a presser movable with said folder and having a supporting wall opposite the edge of said folder.

34. In an apparatus of the character described, in combination, a rotatable former, a freely rotatable folding plate movable toward and from the face of said former, a presser plate carried by said folding plate and spring pressed towards the same in the direction of said former.

35. In an apparatus of the character described, in combination, a rotatable former, a freely rotatable folding plate movable toward and from the face of said former, a presser plate carried by said folding plate and spring pressed towards the same in the direction of said former, and a supporting wall carried by said presser plate spaced from the edge of said folding plate.

36. In an apparatus of the character described, a former, folders, one at either side of said former movable toward and from said former, means adapted to positively rotate said former and one of said folders, simultaneously, the other folder being freely rotatable.

37. In an apparatus of the character described, a former, folders, one at either side of said former movable toward and from said former, means adapted to positively rotate said former and one of said folders, simultaneously, the other folder being freely rotatable and carrying a presser adapted to be arrested during movement of the last mentioned folder toward said former.

38. In an apparatus of the character described, in combination, a former, folders, one at either side of said former movable toward and from said former, means adapted to positively rotate said former and one of said folders, simultaneously, the other folder being freely rotatable and carrying a presser adapted to be arrested during movement of the last mentioned folder toward said former, and means carried by said last mentioned folder adapted to yieldingly press said presser in the direction of said former.

39. In an apparatus of the character described, in combination, a rotatable and intermittently translatable former, a rotatable folder concentric with said former and rotatable and translatable therewith, means adapted to move said folder toward and from said former, a rotatable folder adjacent a point of rest in the translatory path of said former, a presser movable with said last mentioned folder, means adapted to move said last mentioned folder toward and from said former, and means permitting arrest of said presser during movement of said last mentioned folder toward said former.

40. In an apparatus of the character described, in combination, means adapted to feed a strip, and a device movable on the strip in rear of said feed means adapted to iron said strip.

41. In an apparatus of the character described, in combination, means adapted to feed a strip, and a device movable on the strip in rear of said feed means adapted to iron said strip, including a rotatable bar transversely spanning said strip.

42. In an apparatus of the character described, in combination, means adapted to feed a strip, an ironer in contact with said strip, and means adapted to urge said ironer in a direction to loop said strip.

43. In an apparatus of the character described, in combination, means adapted to feed a strip, an ironer in contact with said strip, and yielding means adapted to urge said ironer in a direction to loop said strip.

44. In an apparatus of the character described, in combination, means adapted to feed a strip, a device movable on the strip in rear of said feed means adapted to iron said strip, and means adapted to prevent recession of said strip from said feed means during the ironing operation.

45. In an apparatus of the character described, in combination, a strip feeder, a movable strip ironer, and means adapted to cause said ironer to oppose the pull of the strip feeder.

46. In an apparatus of the character described, in combination, a strip feeder, a movable strip ironer, and means adapted to cause said ironer to oppose the pull of the strip feeder including a pivoted arm to which said ironer is connected at a distance from its pivot.

47. In an apparatus of the character described, in combination, a strip feeder, a movable strip ironer, means adapted to cause said ironer to oppose the pull of the strip feeder including a pivoted arm to which said ironer is connected at a distance from its pivot, and a spring tending to rotate said arm in a direction opposite to the direction of its movement under the feed of the strip.

48. In an apparatus of the character described, in combination, a reciprocatory strip feeder, a strip gluer, and means between the feeder and gluer for ironing and looping the strip.

49. In an apparatus of the character described, in combination, a reciprocatory strip feeder, a strip gluer, means between the feeder and gluer for ironing and looping the strip including an ironing bar, a movable arm to which said bar is connected, and a spring tending to move said arm in a direction to cause said bar to loop and iron the strip.

50. In an apparatus of the character described, in combination, a reciprocatory strip feeder, a strip gluer, means between the feeder and gluer for ironing and looping the strip including an ironing bar, a pivoted arm to which said bar is connected, and a spring adapted to rotate said arm and cause said bar to loop said strip and move thereon in a direction reverse to the advance of the strip.

51. In an apparatus of the character described, in combination, a reciprocatory strip feeder, a strip gluer, means between the feeder and gluer for ironing and looping the strip, and means movable with the strip feeder to arrest recession of the feed end of the strip during said ironing and looping.

52. In an apparatus of the character described, in combination, a reciprocatory strip feeder, a strip gluer, means between the feeder and gluer for ironing and looping the strip including an ironing bar, a pivoted arm to which said bar is connected, a spring adapted to rotate said arm and cause said bar to loop said strip and move thereon in a direction reverse to the advance of the strip, and a strip arresting dog on said feeder.

53. In an apparatus of the character described, in combination, a plurality of formers intermittently translatable in an endless path, means adapted to simultaneously rotate said formers a plurality of times at the several stations of rest in said endless path, and devices at each of three of said stations, adapted to feed and apply a strip for being coiled around the respective formers, and to sever such strip.

54. In an apparatus of the character described, in combination, a plurality of formers intermittently translatable in an endless path, means adapted to simultaneously rotate said formers a plurality of times at the several stations of rest in said endless path, devices at each of three of said stations, adapted to feed and apply a strip for being coiled around the respective formers, and to sever such strip, means adapted to glue the strip applied at the first of said three stations, and means adapted to moisten a part width of the sizing of a dry-sized strip applied at the second of said three stations.

55. In an apparatus of the character described, in combination, a plurality of formers intermittently translatable in an endless path, means adapted to simultaneously rotate said formers a plurality of times at the several stations of rest in said endless path, devices at each of three of said stations, adapted to feed and apply a strip for being coiled around the respective formers, and to sever such strip, means adapted to glue the strip applied at the first of said three stations, means adapted to moisten a part width of the sizing of a dry-sized strip applied at the second of said three stations, and means adapted to glue the strip applied at the third of said three stations and turn one side thereof across the adjacent edge of the underlying coiled strip as the strip is coiled at said third station.

56. In an apparatus of the character described, in combination, a plurality of formers intermittently translatable in an endless path, means adapted to simultaneously rotate said formers a plurality of times at the several stations of rest in said endless path, devices at each of three of said stations adapted to feed and apply a strip for being coiled around the respective formers, and to sever such strip, means adapted to glue the strip applied at the first of said three stations, means adapted to moisten a part width of the sizing of a dry-sized strip applied at the second of said three stations, means adapted to glue the strip applied at the third of said three stations and turn one side thereof across the adjacent edge of the underlying coiled strip as the strip is coiled at said third station, and means adapted to iron the strip as it is fed to said third station.

57. In an apparatus of the character described, in combination, a plurality of formers intermittently translatable in an endless path, means adapted to simultaneously rotate said formers a plurality of times at the several stations of rest in said endless path, devices at each of three of said stations adapted to feed and apply a strip for being coiled around the respective formers, and to sever such strip, means adapted to glue the strip applied at the first of said three stations, means adapted to moisten a part width of the sizing of a dry-sized strip applied at the second of said three stations, means adapted to glue the strip applied at the third of said three stations, means adapted to turn the opposite sides of said last mentioned strip across the opposite edges of the underlying coiled strips, and a rotatable folder at a fourth station, movable toward and from the former, adapted to fold one of said turned parts into and against the inner face of one of the underlying coiled strips.

58. In an apparatus of the character described, in combination, a plurality of formers intermittently translatable in an endless path, means adapted to simultaneously rotate said formers a plurality of times at the several stations of rest in said endless path, devices at each of three of said stations, adapted to feed and apply a strip for being coiled around the respective formers, and to sever such strip, means adapted to glue the strip applied at the first of said three stations, means adapted to moisten a part width of the sizing of a dry-sized strip applied at the second of said three stations, means adapted to glue the strip applied at the third of said three stations, fingers movable into and out of the translatory path of the formers, adapted to turn the opposite sides of said last mentioned strip across the opposite edges of the underlying coiled strips, and folders, one carried by and concentric with the respective former, and one at a fourth station, said folders being movable toward and from the former at said fourth station, adapted to fold said turned parts into and against the inner face of the underlying coiled strips.

59. In an apparatus of the character described, in combination, a plurality of formers intermittently translatable in an endless path, means adapted to simultaneously rotate said formers a plurality of times at the several stations of rest in said endless path, devices at each of three of said stations, adapted to feed and apply a strip for being coiled around the respective formers, and to sever such strip, means adapted to glue the strip applied at the first of said three stations, means adapted to moisten a part width of the sizing of a dry-sized strip applied at the second of said three stations, means adapted to glue the strip applied at the third of said three stations, fingers movable into and out of the translatory path of the formers, adapted to turn the opposite sides of said last mentioned strip across the opposite edges of the underlying coiled strips, and folders, one carried by and concentric with the respective former, and one at a fourth station, said folders being movable toward and from the former at said fourth station, adapted to fold said turned parts into and against the inner face of the underlying coiled strips, the said folder at the fourth station being freely rotatable.

60. In an apparatus of the character described, in combination, a plurality of formers intermittently translatable in an endless path, means adapted to simultaneously rotate said formers a plurality of times at the several stations of rest in said endless path, devices at each of three of said stations, adapted to feed and apply a strip for being coiled around the respective formers, and to sever such strip, means adapted to glue the strip applied at the first of said three stations, means adapted to moisten a part width of the sizing of a dry-sized strip applied at the second of said three stations, means adapted to glue the strip applied at the third of said three stations, fingers movable into and out of the translatory path of the formers, adapted to turn the opposite sides of said last mentioned strip across the opposite edges of the underlying coiled strips, and folders, one carried by and concentric with the respective former, and one at a fourth station, said folders being movable toward and from the former at said fourth station, adapted to fold said turned parts into and against the inner face of the underlying coiled strips, and means carried by one of said folders, adapted to press the folded parts at the edge of the coiled strips.

61. In an apparatus of the character described, in combination, a plurality of formers intermittently translatable in an endless path, means adapted to simultaneously rotate said formers a plurality of times at the several stations of rest in said endless path, devices at each of three of said stations, adapted to feed and apply a strip for being coiled around the respective formers, and to sever such strip, means adapted to glue the strip applied at the first of said three stations, means adapted to moisten a part width of the sizing of a dry-sized strip applied at the second of said three stations, means adapted to glue the strip applied at the third of said three stations, fingers movable into and out of the translatory path of the formers, adapted to turn the opposite sides of said last mentioned strip across the opposite edges of the underlying coiled strips, and folders, one carried by and concentric with the respective former, and one at a fourth station, said folders being movable toward and from the former at said fourth station, adapted to fold said turned parts into and against the inner face of the underlying coiled strips, means carried by one of said folders, adapted to press the folder parts at the edge of the coiled strips, and having a supporting wall opposite the edge of such folder.

In testimony whereof I affix my signature, in the presence of two witnesses.

HAROLD CARLE.

Witnesses:
J. W. ANDERSON,
A. C. COPPINS.